United States Patent [19]

Forster

[11] 4,103,555

[45] Aug. 1, 1978

[54] PRESSURE SENSOR FOR HIGH-TEMPERATURE LIQUIDS

[75] Inventor: George A. Forster, Westmont, Ill.

[73] Assignee: The United States of America as represented by the United States Department of Energy, Washington, D.C.

[21] Appl. No.: 804,123

[22] Filed: Jun. 6, 1977

[51] Int. Cl.² ............................ G01L 7/08; G01L 9/12
[52] U.S. Cl. ........................................ 73/706; 73/718
[58] Field of Search ................. 73/398 C, 395, 410, 73/407 R, 706, 716–717, 718, 719, 720, 721, 722; 361/283

[56] References Cited

U.S. PATENT DOCUMENTS

| 2,883,995 | 4/1959 | Bialous et al. | 73/395 |
| 3,067,614 | 12/1962 | Rich | 73/395 |

*Primary Examiner*—Donald O. Woodiel

*Attorney, Agent, or Firm*—Dean E. Carlson; Frank H. Jackson; Donald P. Reynolds

[57] ABSTRACT

A pressure sensor for use in measuring pressures in liquid at high temperatures, especially such as liquid sodium or liquid potassium, comprises a soft diaphragm in contact with the liquid. The soft diaphragm is coupled mechanically to a stiff diaphragm. Pressure is measured by measuring the displacment of both diaphragms, typically by measuring the capacitance between the stiff diaphragm and a fixed plate when the stiff diaphragm is deflected in response to the measured pressure through mechanical coupling from the soft diaphragm. Absolute calibration is achieved by admitting gas under pressure to the region between diaphragms and to the region between the stiff diaphragm and the fixed plate, breaking the coupling between the soft and stiff diaphragms. The apparatus can be calibrated rapidly and absolutely.

4 Claims, 1 Drawing Figure

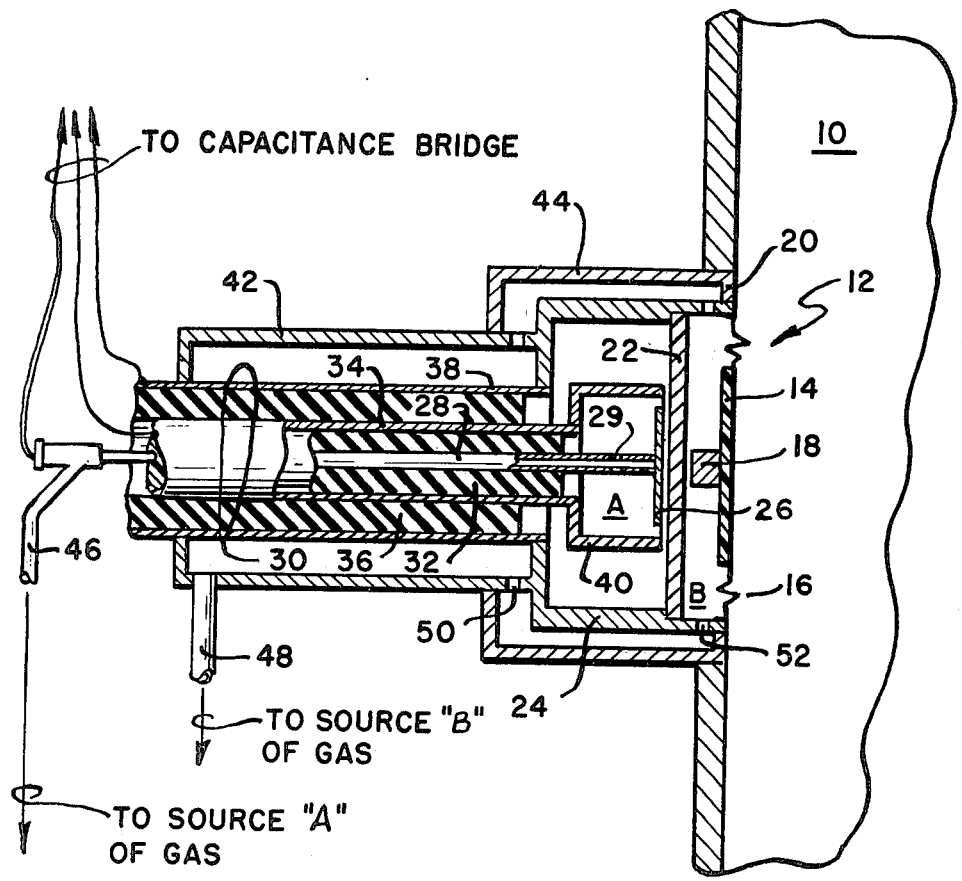

PRESSURE SENSOR FOR HIGH-TEMPERATURE LIQUIDS

CONTRACTUAL ORIGIN OF THE INVENTION

The invention described herein was made in the course of, or under, a contract with the United States Energy Research and Development Administration.

BACKGROUND OF THE INVENTION

This invention relates to the measurement of pressure in high-temperature liquids. It is especially useful for measuring pressure in liquid metals such as liquid sodium or liquid potassium.

Operation of a liquid-metal fast breeder reactor requires information about the pressure of the liquid metal over a range of gage pressures from zero to more than 300 lbs. per square inch (2MPa) and at temperatures ranging from 700°–800° F. (644–700 K) at the inlet to 1000°–1200° F. (810–922 K) at the outlet. Such pressures have in the past been measured by a metal diaphragm exposed on one side to the pressure to be measured and on the other side to an externally applied pressure of air or some other convenient gas. To operate the gage, gas pressure is applied to one side of the diaphragm to cause it to achieve a neutral position. If areas are equal on both sides of the diaphragm, then the pressure necessary to place the diaphragm in the neutral position is the pressure of the liquid metal. If the areas differ, then the pressures are in the inverse ratio of the areas. Operation then comprises cycling the pressure up and down for small amounts about the mean valve over a period of a few seconds. If the test pressure has changed since the reference pressure was set, then this cycling will cause the diaphragm to assume a different mean position. The new pressure is then determined by changing the reference pressure to restore the neutral position of the diaphragm. This process takes a time of the order of half a minute to make a measurement, and the measurement is ambiguous if the pressure being measured is not constant during that half minute. The calibration also varies over time as the spring constant of the diaphragm changes from thermal stress or corrosion.

It is an object of the present invention to provide a better means of sensing pressure in high-temperature liquids.

It is a further object of the present invention to provide a means for sensing pressure in high-temperature liquids, which means can be calibrated quickly in situ.

Other objects will become apparent in the course of a detailed description of the invention.

SUMMARY OF THE INVENTION

A sensor of pressure in a high-temperature liquid comprises a soft diaphragm exposed on one side to the liquid. The soft diaphragm is placed to push against a stiff diaphragm in response to pressure in the liquid. The displacement of the stiff diaphragm is proportional to the difference between the pressure of the liquid and a reference gas pressure. This displacement may be measured conveniently by means such as a capacitance displacement gage. An electrically conducting plate placed in a fixed position near the stiff diaphragm forms with it a capacitor, the capacitance of which varies with displacement of the stiff diaphragm. The conducting plate is surrounded by a guard ring and the guard ring, conducting plate and stiff diaphragm are connected by triaxial cable to a means of measuring capacitance. A source of gas pressure coupled to one side of the soft diaphragm and to the region including the capacitor enables calibration of the capacitance as a function of pressure applied to one side of the stiff diaphragm. In the preferred embodiment separate sources of gas are connected to the two regions for calibration. In an alternate embodiment the regions are coupled together to the same source of pressure.

BRIEF DESCRIPTION OF THE DRAWING

The drawing is a sectional side view of the apparatus of the present invention.

DETAILED DESCRIPTION OF THE INVENTION

The drawing is a sectional side view of the apparatus of the present invention. In the drawing region 10 contains a liquid such as liquid sodium, liquid potassium, or the like at a pressure in the range from atmospheric to several hundred psi (several million Pa) and at a temperature that may exceed 1200° F (922 K). These pressures and temperatures are taken as characteristic rather than limiting. The only limit on the pressure is that set by the mechanical strength of the structure which can easily be made to withstand thousands of psi. The temperature is limited between a minimum value sufficient to melt the liquid and a maximum value that is sufficient to maintain the structural integrity of components. Soft diaphragm 12 touches region 10 and is responsive to the pressure in region 10. Soft diaphragm 12 comprises a stiff disk 14, a bellows 16 and a foot 18. Bellows 16 surrounds stiff disk 14 and connects to wall 20. Foot 18 normally makes mechanical contact with stiff diaphragm 22 which is mounted firmly at its edges to collar 24. Plate 26 is an electrical conductor that is mounted in a fixed position to center conductor 28 of triaxial cable 30. Center conductor 28 is surrounded by inner insulator 32 which, in turn, is enclosed cylindrically by inner conductor 34. Intermediate insulator 36 surrounds inner conductor 34 and is surrounded cylindrically by outer conductor 38 to complete triaxial cable 30, which is connected to a conventional capacitance bridge. Inner conductor 34 is connected electrically to and provides mechanical support for guard ring 40, a cylindrical electrical conductor disposed conventionally in a coplanar relation with plate 26 to provide a guard ring for the electrical capacitor that is formed by plate 26 and stiff diaphragm 22. Outer conductor 38 is at electrical ground and supplies such a ground to collar 24. First cylinder 42 is connected to collar 24 and also to cap 44. Cap 44 is connected to wall 20 to serve as part of a means for supplying gas for calibration in the following manner.

It is necessary to have a supply of gas to the side of stiff diaphragm 22 that faces plate 26. This is referred to as region A and includes the volume bounded by stiff diaphragm 22, the inside of collar 24 and of intermediate insulator 36, inner conductor 34, inner insulator 32 and outer conductor 38. In the FIGURE, center conductor 28 is taken as hollow, and is connected by tube 26 to a source of gas under pressure that is thus coupled through hole 29 to region A. The use of a hollow center conductor 28 is simply a matter of convenience, as the pressure connection could be established equally as well by passing a hollow tube through inner insulator 32 or intermediate insulator 34. The region bounded by the opposite side of stiff diaphragm 22, collar 24, bellows 16 and soft diaphragm 12 is denoted region B and is connected to a B source of gas through tube 48, first cylinder 42, through hole 50 into a region formed by the interior of cap 44 and then through hole 52 into region B.

Operation of the pressure sensor has two phases, calibration and measurement. The objective of calibration is to develop a characteristic curve or table of the capacitance measured by the capacitance bridge as a function of the pressure difference regions B and A. To calibrate, a zero position of stiff diaphragm 22 is first established by admitting gas under pressure through tubes 46 and 48 to regions A and B respectively. A zero position is established by making the pressure in region A equal that in region B and each of these pressures is chosen to be greater than the pressure of the liquid metal in region 10. This is determined by increasing the pressures in regions A and B together while observing the capacitance. When the capacitance no longer changes on an increase of the pressure in regions A and B, it is apparent that the pressure in region B has become greater than the pressure in region 10 and, hence, the soft diaphragm 12 will be forced by that pressure away from stiff diaphragm 22. That condition will be maintained throughout the calibration procedure so that foot 18 does not touch stiff diaphragm 22 during calibration. A characteristic curve or table is obtained of values of capacitance of the capacitor formed by plate 26 and stiff diaphragm 22 as a function of the difference in pressure between region B and region A. This is accomplished by keeping in region B a pressure greater than the pressure of the liquid metal in region 10 and reducing the pressure in region A. It is a routine matter to control and measure the pressure of the gases introduced into regions A and B for this calibration procedure.

After the curve is obtained of capacitance as a function of pressure difference, it will be necessary to make a geometrical scaling correction to relate the area of stiff diaphragm 22 to the area of stiff disk 14. This conversion involves a multiplication of the pressure by the inverse ratio of the effective areas of the disks and is performed just once for each instrument.

When the preceding sequence of measurements and calculations described is complete, the sensor is ready for use. This is accomplished by reducing the pressure in region B until foot 18 transmits the pressure from region 10 to stiff diaphragm 22. Operation will be simplest if the pressures in regions A and B are both reduced to atmospheric pressure so that the pressure difference on calibration involves a subtraction of the zero gage pressure of the atmosphere. It is possible, however, and may sometimes be desirable to operate the instrument with the pressure in regions A and B at some value other than atmospheric. This may be desirable to place the capacitance of the capacitor in a desired range for optimum sensitivity, for example, or to reduce the stress on the diaphragm. In the absence of such a consideration, normal operation will include the introduction through tubes 46 and 48 of a dry gas that is inert and is maintained at atmospheric pressure. Such gases include argon and dry nitrogen.

Sensors sued for applications such as that shown herein typically had a single diaphragm that served the dual function of supplying the spring constant against which the liquid metal exerted pressure and also of confining liquid metal through contact. In contrast, the sensor described herein separates the functions of containment and calibration. The soft diaphragm is in contact with hot liquid metals under pressure, but the spring characteristics of the soft diaphragm are not significant to the measurement, because the stiff diaphragm can be made several orders of magnitude stiffer than the soft diaphragm. All of the spring characteristics that are measured are those of the stiff diaphragm which does not tough the liquid metal. When the liquid metal is liquid sodium, liquid potassium or a mixture thereof, it is normally desirable to make the parts that touch the liquid metal out of one of the stainless steels of the three hundred series. This is not necessary with the stiff diaphragm, since it is not touched by the liquid metal. Accordingly, the stiff diaphragm can be made of materials selected for desired elastic and thermal properties without regard to their resistance to damage by the liquid alkali metals. This may be of importance since the typical spacing between the plates of the capacitor is of the order of microns and the typical range of capacitance to be measured by the bridge is of the order of 5 to 20 picofarads.

The embodiment pictured herein measures capacitance to measure displacement, but it should be evident that the measurement of displacement of the stiff diaphragm is the true objective. This displacement could as well be measured inductively, optically, electrically by strain gage, or in any of the other well-known techniques for precise measurement of small displacements.

The embodiments of the invention in which an exclusive property or privilege is claimed are defined as follows:

1. A sensor of pressure in a fluid comprising:
  a soft diaphragm exposed on a first side to the fluid and on a second side to a first source of gas at a first gas pressure;
  a stiff diaphragm exposed on a first side to the first source of gas and on a second side to a second source of gas at a second gas pressure, the stiff diaphragm disposed in pushing engagement with the soft diaphragm such that motion of the soft diaphragm is transmitted to the stiff diaphragm when and only when the pressure in the fluid exceeds the first and second gas pressures; and
  means for measuring displacement of the stiff diaphragm,
which displacement is a function of the pressure in the fluid.

2. The apparatus of claim 1 wherein the means for measuring displacement of the stiff diaphragm comprise:
  a conducting plate disposed substantially parallel to the stiff diaphragm and in close proximity thereto to form a capacitor;
  a guard ring having a conductive surface coplanar with the conducting plate in an annular position about the conducting plate to form with the conducting plate and the stiff diaphragm a guard-ring capacitor;
  a triaxial cable having one conductor each connected to the stiff diaphragm, the conducting plate, and the guard ring; and
  a capacitance bridge connected to the triaxial cable to measure the capacitance of the capacitor formed by the stiff diaphragm and the conducting plate,
which capacitance is a measure of the displacement of the stiff diaphragm.

3. The apparatus of claim 2 comprising in addition a foot connected to the soft diaphragm on the second side to effect the pushing engagement with the soft diaphragm.

4. A sensor for insertion in a wall of a container to measure pressure in high-temperature liquid metals in the container comprising:

an annular bellows connected to an outer edge to the wall of the container;

a stiff disk connected at an outer edge to an inner edge of the annular bellows and forming therewith a soft diaphragm having a first side exposed to the pressure in the container and a second side exposed to a first gas pressure in a first region;

a foot connected to the stiff disk on the second side;

a stiff diaphragm fixed in position at an outer edge and disposed substantially parallel to the soft diaphragm, the stiff diaphragm exposed on a first side to the first gas pressure in the first region and on a second side to a second gas pressure in a second region, the first side touching the foot when the pressure in the liquid metal exceeds the first and second gas pressures and free of the foot when the pressure in the liquid metal is less than the first and second gas pressures;

a collar supporting the outer edge of the stiff diaphragm;

a conducting plate disposed parallel to and close to the stiff diaphragm to form therewith a capacitor;

a hollow center conductor connected to and supporting the conducting plate, the center conductor connected to a source of the second gas pressure;

a first coaxial insulator disposed coaxially about the hollow center conductor;

a first cylindrical shell conductor disposed coaxially about the first coaxial insulator;

a second coaxial insulator disposed coaxially about the first cylindrical shell conductor;

a second cylindrical shell conductor disposed coaxially about the second coaxial insulator, the combination of the hollow center conductor, the first coaxial insulator, the first cylindrical shell conductor, the second coaxial insulator, and the second cylindrical shell conductor comprising a triaxial cable;

a capacitive guard ring disposed to guard the conducting plate, the guard ring connected electrically to and supported by the first cylindrical shell conductor;

a first cylinder connected to the collar and the coaxial cable to support the triaxial cable and forming a portion of the first region at the first gas pressure;

a cylindrical cap connected to the wall and the first cylinder and forming a portion of the first region at the first gas pressure;

a first tube connected through the first cylinder and to the source of the first gas pressure; and a second tube connected to the hollow center conductor and to the source of the second gas pressure;

a capacitance bridge connected to the triaxial cable to measure capacitance of the capacitor formed by the stiff diaphragm and the conducting plate, which capacitance is a measure of the pressure in the liquid metal.

* * * * *